(12) United States Patent
Jaska et al.

(10) Patent No.: US 7,428,719 B2
(45) Date of Patent: Sep. 23, 2008

(54) LAYOUT OF NETWORK USING PARALLEL AND SERIES ELEMENTS

(75) Inventors: David Jaska, Allen, TX (US); Tan Du, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/332,725

(22) Filed: Jan. 17, 2006

(65) Prior Publication Data

US 2006/0117291 A1 Jun. 1, 2006

Related U.S. Application Data

(62) Division of application No. 10/863,177, filed on Jun. 8, 2004, now Pat. No. 7,032,204, which is a division of application No. 10/211,833, filed on Aug. 3, 2002, now Pat. No. 6,848,092.

(51) Int. Cl.
G06F 9/45 (2006.01)
G06F 17/50 (2006.01)
G06F 9/455 (2006.01)
(52) U.S. Cl. .......................... 716/11; 716/8
(58) Field of Classification Search ................ 716/8–11
See application file for complete search history.

(56) References Cited

U.S. PATENT DOCUMENTS

| 3,686,593 | A | 8/1972 | Zakaria | 333/71 |
|---|---|---|---|---|
| 6,013,569 | A | 1/2000 | Lur et al. | 438/595 |
| 6,186,447 | B1 * | 2/2001 | Virdee | 244/188 |
| 6,209,123 | B1 * | 3/2001 | Maziasz et al. | 716/14 |
| 6,405,356 | B1 * | 6/2002 | Yang | 716/10 |
| 6,539,533 | B1 | 3/2003 | Brown, III et al. | 716/17 |
| 6,646,509 | B2 | 11/2003 | Sobel | 330/282 |
| 6,751,784 | B2 | 6/2004 | Du | 716/7 |
| 2002/0171079 | A1 * | 11/2002 | Braun et al. | 257/40 |
| 2004/0013232 | A1 * | 1/2004 | Rahn | 378/98.8 |

* cited by examiner

*Primary Examiner*—Jack Chiang
*Assistant Examiner*—Suresh Memula
(74) *Attorney, Agent, or Firm*—Wade James Brady, III; Frederick J. Telecky, Jr.

(57) ABSTRACT

Disclosed are systems, methods, and algorithms for network layout. A network layout having subnetworks of matching series and parallel elements is systematically generated to implement the network within area constraints. After the selection of the number of rows of network elements, the number of elements in each row, the sequencing of the elements, and the element locations, are systematically determined. The network layout systematically produced reduces the influence of unfavorable factors on the network such as temperature gradients, process gradients, and interference, by dispersing subnetwork elements throughout the layout.

20 Claims, 3 Drawing Sheets

- 100 — SELECT AREA
- 102 — SELECT NUMBER OF ROWS
- 104 — DETERMINE NUMBER OF COLUMNS
- 106 — DETERMINE NUMBER OF ELEMENTS PER ROW
- 108 — DETERMINE ELEMENT SEQUENCE
- 110 — ALLOCATE ELEMENT LOCATIONS
- 112 — ARRANGE ELEMENTS INTO NETWORK LAYOUT

LAYOUT OF NETWORK USING PARALLEL AND SERIES ELEMENTS

This application is a division of Ser. No. 10/863,177, filed Jun. 8, 2004 now U.S. Pat. No. 7,032,204, which is a division of Ser. No. 10/211,833, filed Aug. 3, 2002 now U.S. Pat. No. 6,848,092.

RELATED APPLICATION

U.S. patent application of Du and Jaska, Ser. No. 10/217,285 filed Aug. 12, 2002 entitled "Implementation of Networks Using Parallel and Series Elements," is incorporated herein in its entirety for all purposed by this reference.

TECHNICAL FIELD

The present invention relates in general to systems, methods, and algorithms for layout of networks with parallel and series elements. More particularly, the invention relates to the systematic generation of a schematic or design layout for a network using combinations of matching series and parallel elements.

BACKGROUND OF THE INVENTION

In a network (M) which may be characterized by the quotient of a cross-quantity and a through-quantity, M=cross-quantity/through-quantity, it is generally known that certain relationships govern series and parallel network elements. For example, in an electrical resistor network, resistance (R) is the quotient of voltage (V) and current (i), R=V/i. It is well known that series elements are additive, e.g. $R_{equivalent} = (R_1 + R_2 + R_3 + \ldots R_N)$, and that the equivalent resistance of parallel resistor elements is described by the relationship, $R_{equivalent}^{-1} = (R_1^{-1} + R_2^{-1} + R_3^{-1} + \ldots R_N^{-1})$. Such relationships hold true for other physical networks M as well.

In many engineering applications the problem of how to implement a network using multiple identical elements is encountered. Often such an implementation is sought in order to reduce the influence of unfavorable factors. In integrated circuit layout for example, the effects of an uneven temperature gradient, nonuniform distribution of process layers, and noise emissions from adjacent circuit blocks, may be alleviated by implementing a desired network value, such as resistance or capacitance, using smaller individual elements rather than using one lump-sum component.

Problems arise however, in attempting to describe a network using a combination of series and parallel elements. It is often desirable to use elements with matching physical characteristics. The use of matching network elements helps to equalize the effects of thermal gradients and material gradients and other unfavorable factors. The use of matching elements is also often desirable from a manufacturing standpoint. It is known in the arts to approach the breakdown of a network into series and parallel elements using some degree of trial and error. The problem is made more complex by concerns such as, in the example of integrated circuit and design, the desire to minimize area and the desire to minimize the count of individual network elements or to utilize elements of a particular value or size.

Techniques exist for systematically breaking down a network into series and parallel elements. See for example, the U.S. patent application of Du and Jaska, Ser. No. 10/217,285, filed Aug. 12, 2002, entitled "Implementation of Networks Using Parallel and Series Elements," which is incorporated herein in its entirety for all purposed by this reference. However, once a network has been described in terms of subnetworks of series and parallel elements, the task of laying out the physical network remains a challenging one. In a resistor network for an integrated circuit for instance, a given element value is implemented using a resistor of the appropriate length and width. (Thickness is generally determined by the process and materials used). The network must then be implemented within area limitations. Typically a designer spends long hours attempting to determine a layout for the subnetworks of individual elements and interconnections. The task is complicated by the desirability of distributing elements of each subnetwork throughout the entire network to help alleviate the effects of unfavorable factors. Such cut-and-try layout techniques are tedious, time consuming, and error prone. Oftentimes network layouts have more than one hundred individual elements with the result that misplacement of elements detrimental to performance can go undetected. The number of possible permutations and lack of a systematic approach can lead to inconsistency from designer to designer, which can lead to further complications in circuits having numerous network blocks prepared by numerous designers.

It would be useful and advantageous in the arts to provide algorithms, systems, and methods for systematically laying out networks of parallel and series elements. Such tools could reduce tedium, error, time, cost, and inconsistency in preparing network layouts. Such tools could also be used to generate schematic diagrams describing networks in terms of series and parallel elements.

SUMMARY OF THE INVENTION

In general, the present invention provides systems, methods, and algorithms for network layout. In carrying out the principles of the present invention, in accordance with an embodiment thereof, a method of laying out a network having subnetworks of series and parallel elements includes the selection of a number of rows of network elements for layout within a particular area. The number of elements in each row, the sequencing of the elements, and the element locations are systematically determined. The subnetwork elements are dispersed within the layout.

According to a preferred embodiment of the invention, an algorithm for layout of a network having subnetworks of series and parallel elements includes steps for accepting the input of an area to be occupied by the network and the number of rows of network elements. The number of columns of elements, the number of elements to be placed in each row, sequencing of the elements, element locations, and ultimately a network layout, are determined.

According to another aspect of the invention, a schematic diagram of a network layout is generated.

According to another aspect of the invention, a system for constructing a network layout from a combination of matching series and parallel elements is provided. The system includes means for executing an algorithm to determine the physical layout of the network and means for coupling a quantity of matching series and parallel elements to assemble the network layout.

The invention provides several technical advantages including but not limited to increased efficiency and consistency in network layout, a reduction in tedium and savings in time. The potential for error in laying out a network is also reduced.

BRIEF DESCRIPTION OF THE DRAWINGS

The above and additional features and advantages of the present invention will be more clearly understood from consideration of the following detailed description in connection with the accompanying drawings in which.

References in the detailed description correspond to like references in the figures unless otherwise noted. Like numerals refer to like parts throughout the various figures. The descriptive and directional terms used in the written description such as top, bottom, left, right, etc., refer to the drawings themselves as laid out on the paper and not to physical limitations of the invention unless specifically noted. The drawings are not to scale and some features of embodiments shown and discussed are simplified or exaggerated for illustrating the principles of the invention.

DETAILED DESCRIPTION OF PREFERRED EMBODIMENTS

The invention provides for the systematic layout of a network in a combination of series and parallel elements. The invention may be used for networks which can be expressed in terms of a cross-quantity divided by a through-quantity such as, for example, an electronic network in which by Ohm's law, resistance is the quotient of voltage divided by current. Although for the sake of example the invention is described in terms of electronic resistor networks, it should be understood that the algorithms, methods, and systems described are applicable to other electrical and mechanical networks, such as a network of inductors, field effect or bipolar transistors, or fluid pumps, without departure from the concepts of the invention.

Given a particular network resistance value, there are a very large number of possible implementations using various numbers of various sizes of individual resistor elements. In the implementation of physical networks, engineering considerations narrow the possible implementations. For example it may be desirable to use a particular resistor element value for the implementation of a network, or it may be desirable to implement the network within a particular planar area of an integrated circuit. Once the network has been broken down into a number of individual elements arranged in various subnetworks of elements connected in series or parallel, an implementation is chosen.

Generally, it is preferred in the electronic arts to use matching network elements to layout a network in a given area determined by design specifications or space available on a chip. With the area given as an initial constraint, the number of rows may be selected. The selection of the number of rows is generally related to the total area available for the network, the number of elements in the network, and the values of the individual elements. The values of the individual elements is generally determinative of the length and width of each element. Other design factors known in the arts may influence how much additional space may be required between elements to avoid interference or other detrimental conditions.

Figure 1:
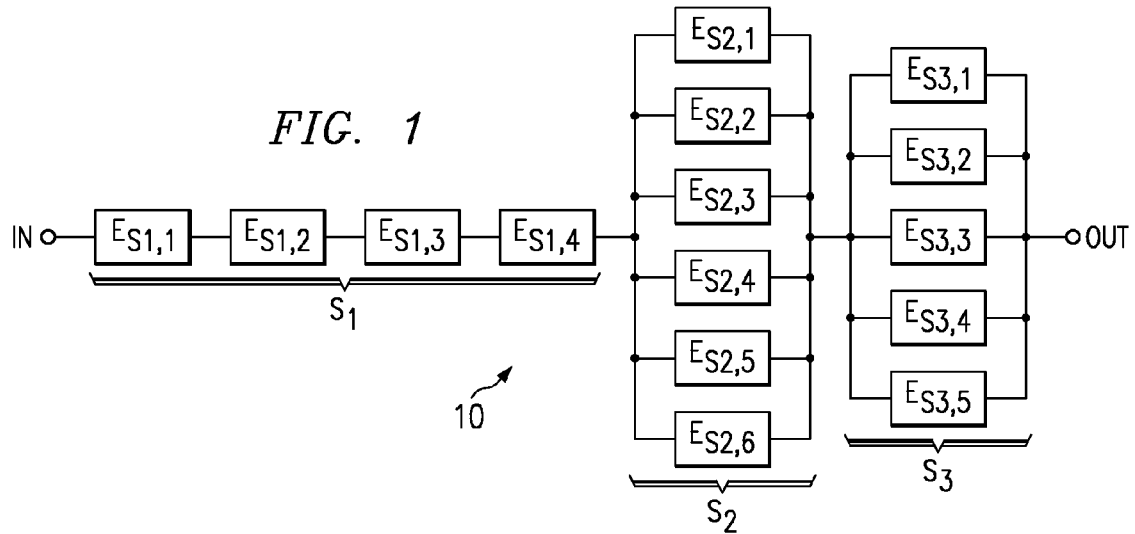
FIG. 1 is a graphical representation of a network used in describing an example of the invention.

FIG. 1 depicts an example of a network 10 for the purposes of explaining the layout of a given network according to the invention. The network 10 has three subnetworks $S_n$. Each of the subnetworks $S_n$ has a number of elements $E_{Sn,m}$ connected in series or in parallel, in this case resistors. A first subnetwork $S_1$ is made up of four elements $E_{S1,1}$, $E_{S1,2}$, $E_{S1,3}$, and $E_{S1,4}$, connected in series. A second subnetwork $S_2$ is made up of six elements $E_{S2,1}$, $E_{S2,2}$, $E_{S2,3}$, $E_{S2,4}$, $E_{S2,5}$, and $E_{S2,6}$, connected in parallel. A third subnetwork $S_3$ is made up of five elements $E_{S3,1}$, $E_{S3,2}$, $E_{S3,3}$, $E_{S3,4}$, and $E_{S3,5}$, connected in parallel.

In this example there are three subnetworks $S_n$ and a total of 15 individual elements $E_{Sn,m}$. It should be understood that the individual elements $E_{Sn,m}$ are interchangeable matching elements arbitrarily numbered "m" for reference for the purposes of this illustrative example. The network 10 is shown and described for the sake of example only and is not intended to limit the invention to one specific application or level of complexity. It may be expected that the actual implementation of the invention by those skilled in the arts will involve many more subnetworks and elements in complex arrangements. For instance, the network of the example could itself be a small subnetwork within a larger network. For the sake of this example a layout and schematic are devised for the network 10 shown.

Figure 2:
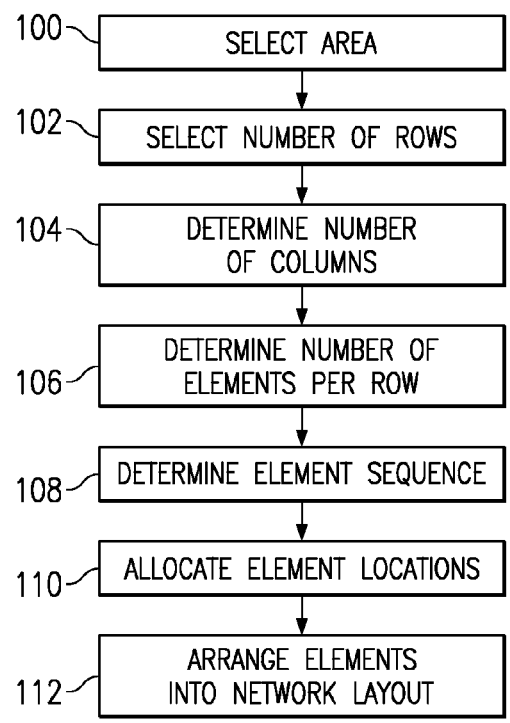
FIG. 2 is a process flow diagram illustrating the systematic layout of a network with a combination of series and parallel elements.

FIG. 2 is a process flow diagram illustrating an example of the steps in a preferred embodiment of the invention. An area is selected for occupation by a network having a number of subnetworks and individual elements connected either in series or in parallel, as shown in step 100. The total number of rows of elements is determined, preferably based on factors such as area available and element size, step 102. The number of columns is determined, in step 104, preferably based on the total number of elements in the network and the number of rows. As shown at step 106, the number of elements per row is determined, including both a whole number value and if necessary, a remainder. The remainder values are retained for later summing and inclusion within the network area. The element sequencing is determined at step 108 by dividing a selected reference value by the number of elements needed per row. At step 110, the element locations are allocated according to the sequencing and the number of elements per row. At step 112, the elements are arranged into a network layout or a schematic is generated.

Figure 3A:
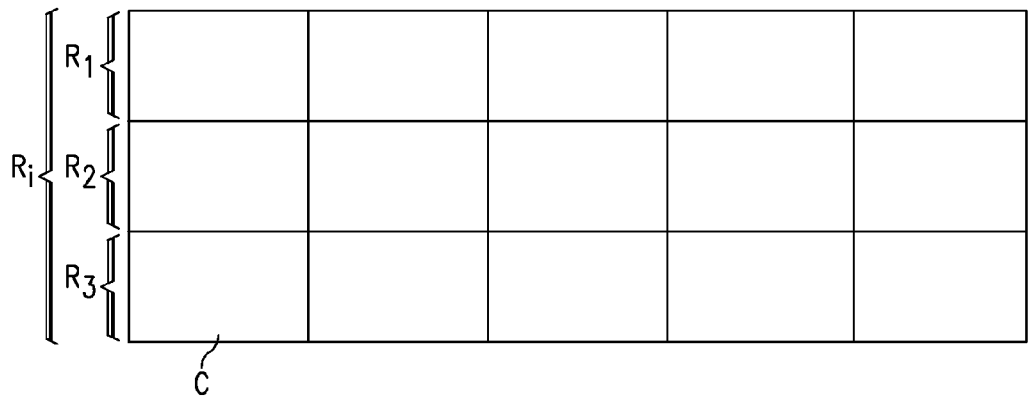
FIGS. 3A through 3D are block diagrams illustrating an example of the systematic layout of a network using the invention.

FIG. 3A provides a graphical representation of a network area 30 with a selected number of rows $R_i$. As shown for the sake of example, three rows, $R_1$, $R_2$, and $R_3$ have been elected for the implementation of the network 10. Typically, the number of rows is selected based on factors such as the area available and the size of the desired elements. It should be understood that the number of rows need not be a whole number factor or multiple of the number of subnetworks $S_n$ or number of elements E. The number of columns C in the network area 30 is preferably determined based on the quotient of the number of elements E and the number of rows R.

$$C = E/R \qquad (1).$$

The number of subnetwork elements to be placed in each row $E_{SnR}$ is preferably determined by the quotient of the number of elements per subnetwork $E_{Sn}$ and the number of rows R. Of course, there may often be a remainder $r_{Sn}$ for a subnetwork.

$$E_{SnR} = E_{Sn}/R \qquad (2).$$

Both the whole number results and the remainders are retained for each subnetwork $S_n$. Preferably, once all of the quotients $E_{SnR}$ have been determined, all of the remainder values $r_{Sn}$ are summed.

$$r = \Sigma r_{Sn} \qquad (3).$$

The number of remainder elements $E_r$ per row R may then be determined using equation (2), dividing the remainder sum r by the number of rows R.

$$E_r = r/R \qquad (2).$$

In the present numerical example, using equation (2) the number of subnetwork elements $E_{SnR}$ per network row R is determined as follows:

$$E_{S1R} = E_{S1}/R \qquad (2)$$

$$E_{S1R} = 4/3$$

$$E_{S1R} = 2$$

$$r_{S1} = 1$$

$$E_{S2R} = E_{S2}/R \qquad (2)$$

$$E_{S2R} = 6/3$$

$$E_{S2R} = 2$$

$$r_{S2} = 0$$

$$E_{S3R} = E_{S3}/R \qquad (2)$$

$$E_{S3R} = 5/3$$

$$E_{S3R} = 1$$

$$r_{S3} = 2$$

The remainder elements are summed for inclusion in the network, $$r = \Sigma r_{Sn} = r_{S1} + r_{S2} + r_{S3} \qquad (3),$$

$$r = 1 + 0 + 2 = 3$$

and the number of remainder elements per row is determined, $$E_r = r/R \qquad (2).$$

$$E_r = 3/3 = 1$$

At this point in the numerical example, it should be appreciated that it has been systematically determined that the network 10 layout will have three rows $R_i$ containing five columns C. Each of the rows $R_i$ will include one element of subnetwork one $E_{s1}$, two elements of subnetwork two $E_{s2}$, one element of subnetwork three $E_{s3}$, and one of the remainder elements $E_r$, distributed among the rows $R_i$ as further described.

Figure 3B:
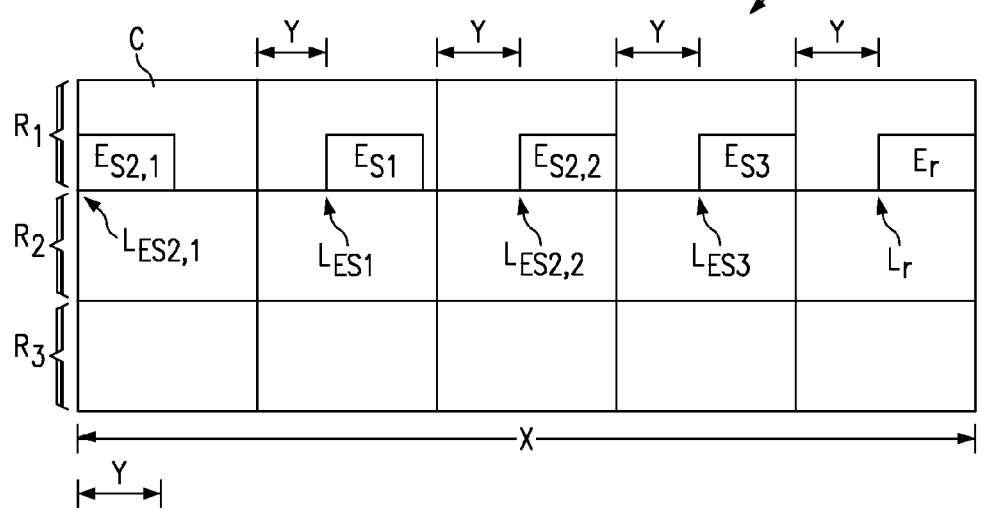

Now referring primarily to FIG. 3B, the sequencing $Z_{Sn}$ of the elements $E_{Sn}$ within each of the rows $R_i$ is preferably determined using a reference value X. The reference value may be an arbitrarily selected value. In this example, the arbitrary reference value twelve is used. It should be understood that the reference value is used to determine the sequence of the elements relative to one another, and is not a physical measurement. Preferably, the actual physical spaces between the elements are determined by operational considerations known in the arts. The sequencing $Z_{Sn}$ between the elements $E_{Sn}$ in each row $R_i$ is determined by dividing the reference value X by the number of subnetwork elements per row $E_{SnR}$. In performing this operation for the elements $E_{Sn}$ of each subnetwork, for all but the first element $E_{Sn}$, the reference value X is preferably incremented by a small additional offset value Y, preferably less than about 10 percent of the reference value X, so that the beginning points of elements $E_{Sn}$ on each adjacent row $R_i$ are offset from one another in the result.

$$Z_{Sn} = (X+Y)/E_{SnR} \qquad (3).$$

This operation is performed for the each of the subnetwork elements $E_{SnR}$ determine to be included in each row, and also with the sum of the remainders r. Accordingly, continuing the numerical example yields:

$$Z_{s1} = (X+Y)/E_{S1R} \qquad (3)$$

$$Z_{S1} = (12+0)/1$$

$$Z_{S1} = 12$$

$$Z_{S2} = (X+Y)/E_{S2R} \qquad (3)$$

$$Z_{S2} = (12+0.1)/2$$

$$Z_{S2} = 6.05$$

$$Z_{S3} = (X+Y)/E_{S3R} \qquad (3)$$

$$Z_{S3} = (12.1+0.1)/1$$

$$Z_{S3} = 12.2$$

$$Z_r = (X+Y)/E_r \qquad (3).$$

$$Z_r = (12.2+0.1)/1$$

$$Z_r = 12.3$$

The example is further illustrated with reference to FIG. 3C. In order to determine the placement of each element within a row, the beginning location $L_{ESn}$ of each element $E_{Sn}$ is determined by multiplying it with the applicable sequencing value $Z_{Sn}$.

$$L_{ESn} = Z_{Sn} * E_{Sn} \qquad (5).$$

For the first subnetwork element $E_{S1}$, the sequencing value has been determined to be $Z_{Sn} = 12.0$, thus the first element $E_{Sn}$ of the first subnetwork, will begin 12.0 reference units from the beginning (0.0 reference units) of the first row:

$$L_{ESn} = Z_{Sn} * E_{Sn} \qquad (5).$$

$$L_{ES1} = 12.1 * 1$$

$$L_{ES1} = 12.0$$

Since there are two elements of the second subnetwork $S_2$ in each row, as indicated by $E_{S2R} = 2$, the operation of equation (5) is performed twice, once for each element:

$$L_{ES2,1} = Z_2 * E_{S2,1} \qquad (5)$$

$$L_{ES2,1} = 6.05 * 1$$

$$L_{ES2,1} = 6.05$$

$$L_{ES2,2} = Z_2 * E_{S2,2} \qquad (5).$$

$$L_{ES2,2} = 6.05 * 2$$

$$L_{ES2,2} = 12.1$$

Row three $R_3$, and the set of remainders r, have each been allocated one element per row, therefore for row three $R_3$:

$$L_{ES3}=Z_3*E_{S3} \quad (5),$$

$$L_{ES3}=12.2*1$$

$$L_{ES3}=12.2$$

and for the remainder;

$$L_r=Z_r*E_r \quad (5).$$

$$L_r=12.3*1$$

$$L_r=12.3$$

Each of the location values $L_{ESn}$ is identified with a particular element $E_{Sn,m}$ and the values are sorted, preferably using common sorting techniques, to determine the element order. For the first row $R_1$, further referring to FIG. 3B, element $E_{S2,1}$, with a location of $L_{ES2,1}=6.05$, is allocated the first location in the first row $R_1$. Element $E_{S1}$, with a location of $L_{ES1}=12.0$, is placed second. Element $E_{S2,2}$ is placed third since $E_{S2,2}=12.1$. Next, $L_{ES3}=12.2$, therefore element $E_{S3}$ is placed at the next location. Using $L_r=12.3$, a location is allocated to one of the remainder elements.

It can be seen that the first row $R_1$ has one element E of subnetwork one $S_1$, two elements E of subnetwork two $S_2$, and one element E of subnetwork three $S_3$, plus one additional remainder element $E_r$. Thus, the five columns C in the first row $R_1$ of the network layout 11 have been systematically determined, distributing elements E of the various subnetworks $S_n$ throughout.

Figure 3C:
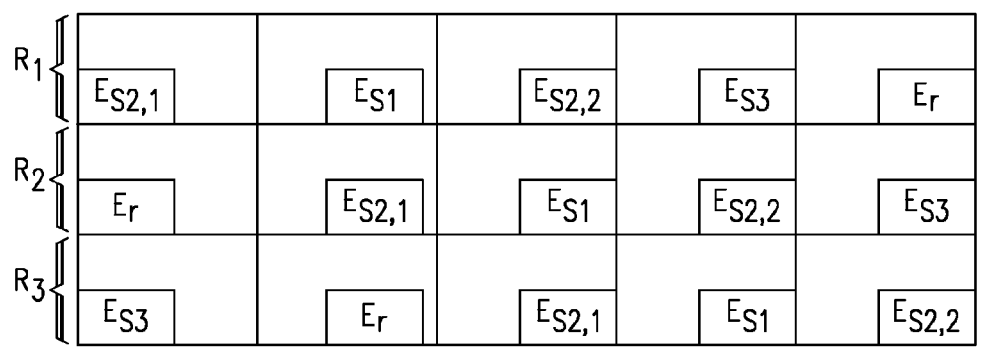

Further referring primarily to FIG. 3C, in populating subsequent rows $R_t$, a shifting technique is preferably used in order to ensure that the subnetwork elements $E_{Sn}$ are distributed in order to help alleviate the effects of unfavorable factors. Various shifting techniques known in the arts may be used. In the present example, a right shift is used wherein the elements of the second row $R_2$ are copied from the first row $R_1$, shifting each element one location to the right. The rightmost element is then shifted to the leftmost position of the row. The third row $R_3$ is determined in the same manner, using a copy of row two $R_2$ shifted one element to the right.

Figure 3D:
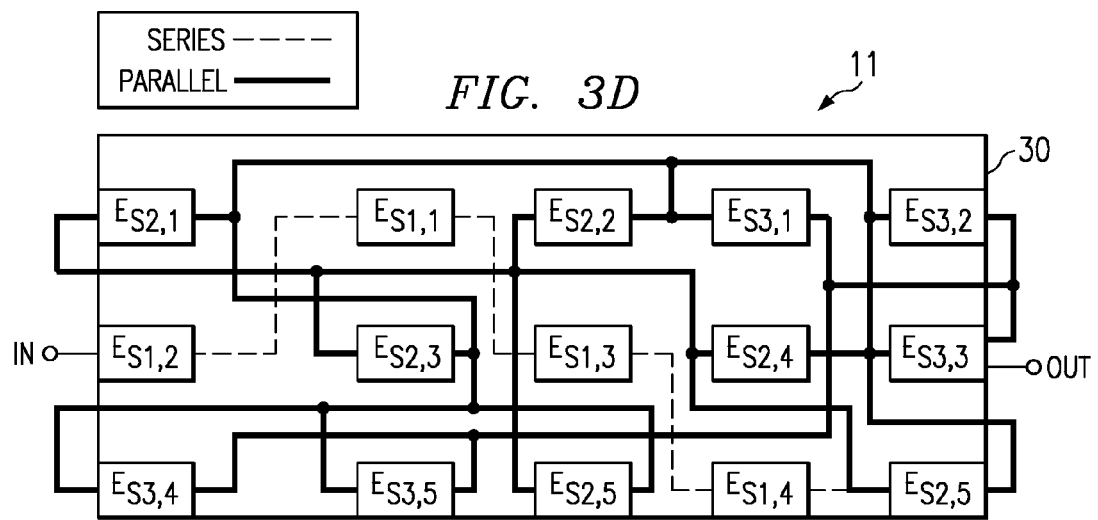

Preferably, the remainder locations $L_r$ are populated in sequence. This is shown in FIG. 3D. Also shown in FIG. 3D, appropriate series and parallel connections, in this case electrical connections, differentiated in the figure by dashed lines, are made among the elements of the network. The electrical connections are preferably made using methods and tools known in the arts. It will be appreciated by those skilled in the arts that the network layout 11 of FIG. 3D is electrically equivalent to the resistor network 10 of FIG. 1. The network layout 11 is more resistant to unfavorable factors due to the distribution of subnetwork elements. The layout 11 of FIG. 3D is also consistently reproducible using the invention and uses only the specified area 30.

Figure 4:
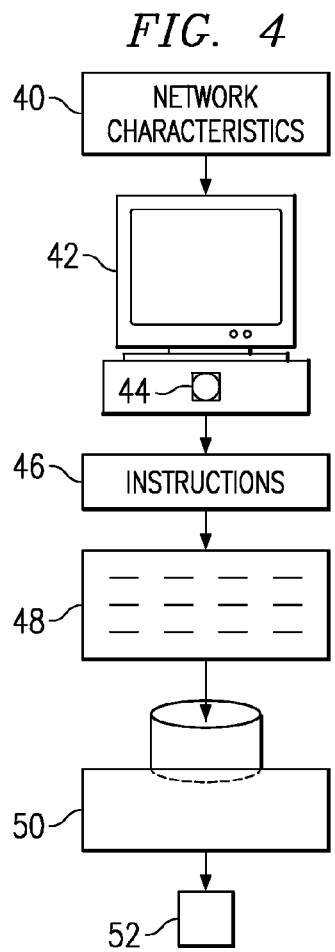
FIG. 4 is a block diagram depicting an example of a system of the invention.

FIG. 4 illustrates an example of a preferred embodiment of a system of the invention. Characteristics 40 of a network including a subnetwork breakdown are preferably input to a machine 42 for executing an algorithm 44 for determining the physical layout of the network with a combination of matching series and parallel elements. Instructions 46 are generated for the layout 48 of the network and additional machinery 50 implements the determined network layout 48 in the form of an integrated circuit 52.

The invention provides systems, methods, and algorithms for determining and realizing the layout of a network of matching parallel and series elements. The invention provides many advantages including but not limited to the systematization and automation of network layout, resulting in reduced design time and costs. The invention may also be advantageously used to generate layout schematics and to increase consistency in network layout. While the invention has been described with reference to illustrative embodiments, this description is not intended to be construed in a limiting sense. Various modifications and combinations of the illustrative embodiments as well as other embodiments of the invention will be apparent to persons skilled in the art upon reference to the description and claims.

We claim:

1. A system for assembling an integrated circuit having at least one subnetwork of series and parallel elements, comprising:
   means for selecting an area of a chip to be occupied by the subnetwork having rows of elements and columns of elements;
   means to select the number of said rows of elements of said subnetwork to be disposed in said area;
   means to determine the number of said columns of said elements;
   means to determine the number of said elements to be placed in each said row;
   means to determine the sequencing of said elements;
   means to allocate locations of said elements; and
   means to arrange said elements into a network layout.

2. The system of claim 1 wherein the means to determine the number of columns further comprises taking the quotient of the total number of elements divided by the number of rows.

3. The system of claim 2 wherein the means to determine the sequencing of the elements further comprises taking the quotient of a predetermined reference value divided by the number of elements per subnetwork in each row.

4. The system of claim 2 wherein the means to allocate element locations further comprises taking the product of a determined sequencing value and the number of elements per row.

5. The system of claim 2 wherein the means arrange the elements into a network layout further comprises dispersing subnetwork elements within the layout.

6. The system of claim 2 wherein the network layout comprises a resistor network layout.

7. The system of claim 2 wherein the network layout comprises an inductor network layout.

8. The system of claim 2 wherein the network layout comprises a transistor network layout.

9. The system of claim 1 wherein the means to determine the number of elements to be placed in each row further comprises taking the quotient of the number of elements per subnetwork divided by the number of rows.

10. The system of claim 9 wherein the means to determine the sequencing of the elements further comprises taking the quotient of a predetermined reference value divided by the number of elements per subnetwork in each row.

11. The system of claim 9 wherein the means to allocate element locations further comprises taking the product of a determined sequencing value and the number of elements per row.

12. The system of claim 9 wherein the means arrange the elements into a network layout further comprises dispersing subnetwork elements within the layout.

13. The system of claim 9 wherein the network layout comprises a resistor network layout.

14. The system of claim 9 wherein the network layout comprises an inductor network layout.

15. The system of claim 1 wherein the means to determine the sequencing of the elements further comprises taking the quotient of a predetermined reference value divided by the number of elements per subnetwork in each row.

16. The system of claim 1 wherein the means to allocate element locations further comprises taking the product of a determined sequencing value and the number of elements per row.

17. The system of claim 1 wherein the means to arrange the elements into a network layout further comprises dispersing subnetwork elements within the layout.

18. The system of claim 1 wherein the network layout comprises a resistor network layout.

19. The system of claim 1 wherein the network layout comprises an inductor network layout.

20. The system of claim 1 wherein the network layout comprises a transistor network layout.

* * * * *